US011501686B2

(12) United States Patent
Pahalawatta

(10) Patent No.: US 11,501,686 B2
(45) Date of Patent: *Nov. 15, 2022

(54) IMAGE FORMAT CONVERSION USING LUMINANCE-ADAPTIVE DITHERING

(71) Applicant: AT&T Intellectual Property I, L.P., Atlanta, GA (US)

(72) Inventor: Peshala Pahalawatta, Burbank, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/092,892

(22) Filed: Nov. 9, 2020

(65) Prior Publication Data

US 2021/0056886 A1 Feb. 25, 2021

Related U.S. Application Data

(63) Continuation of application No. 15/914,355, filed on Mar. 7, 2018, now Pat. No. 10,832,613.

(51) Int. Cl.
*G09G 3/20* (2006.01)
*H04N 9/77* (2006.01)

(52) U.S. Cl.
CPC ......... *G09G 3/2044* (2013.01); *G09G 3/2096* (2013.01)

(58) Field of Classification Search
CPC ............................... G09G 3/2044; H04N 9/77
See application file for complete search history.

(56) References Cited

U.S. PATENT DOCUMENTS

| | | | |
|---|---|---|---|
| 4,937,677 | A | 6/1990 | van Dorsselaer |
| 5,638,187 | A | 6/1997 | Cariffe |
| 6,441,867 | B1 | 8/2002 | Daly |
| 8,750,390 | B2 | 6/2014 | Sun et al. |
| 9,736,419 | B2 | 8/2017 | Kozuka et al. |
| 2011/0051817 | A1 | 3/2011 | Mizoguchi |
| 2012/0133668 | A1 | 5/2012 | Harada et al. |
| 2012/0154423 | A1 | 6/2012 | Barnhoefer et al. |
| 2014/0363093 | A1 | 12/2014 | Miller et al. |
| 2016/0330513 | A1 | 11/2016 | Toma et al. |

(Continued)

OTHER PUBLICATIONS

ITU-R Rec. BT. 1886, "Reference electro-optical transfer function for flat panel displays used in HDTV studio production," International Telecommunications Union, 2011. 7 Pages.

(Continued)

*Primary Examiner* — Yi Yang

(57) ABSTRACT

In one example, the present disclosure describes a device, computer-readable medium, and method for image format conversion using luminance-adaptive dithering. For instance, in one example, a method includes acquiring an image in a first format, wherein the first format is associated with a first electro-optical transfer function, identifying a second format to which to convert the image, wherein the second format is associated with a second electro-optical transfer function, and applying dithering to the image in the second format, based on an evaluation of a luminance-dependent metric against a predefined threshold, wherein the luminance-dependent metric is computed from at least one of the first electro-optical transfer function and the second electro-optical transfer function.

20 Claims, 4 Drawing Sheets

300

(56) References Cited

U.S. PATENT DOCUMENTS

| | | | |
|---|---|---|---|
| 2016/0360214 A1 | 12/2016 | Sole Rojals et al. |
| 2017/0006273 A1 | 1/2017 | Borer et al. |
| 2017/0026627 A1 | 1/2017 | Toma et al. |
| 2017/0134703 A1 | 5/2017 | Norkin |
| 2017/0249721 A1 | 8/2017 | Hirai |
| 2018/0027262 A1 | 1/2018 | Reinhard et al. |
| 2018/0048845 A1 | 2/2018 | Kozuka et al. |
| 2018/0048892 A1 | 2/2018 | Norkin |
| 2018/0220144 A1 | 8/2018 | Su et al. |

OTHER PUBLICATIONS

SMPTE ST. 2084:2014, "High Dynamic Range Electro-Optical Transfer Function of Mastering Reference Displays," The Society for Moving Picture and Television Engineers, 2014. 14 Pages.

"Technical Summary for S-Gamut3.Cine/S-Log3 and S-Gamut3/S-Log3," https://www.sony.co.uk/pro/support/attachment/1237494271390/1237494271406/technical-summary-for-s-gamut3-cine-s-log3-and-s-gamut3-s-log3.pdf. 7 Pages.

ITU-R Rec. BT. 2100-0, "Image parameter values for high dynamic range television for use in production and International programme exchange," International Telecommunications Union, 2016. 17 Pages.

P. G. J. Barten, "Formula for the contrast sensitivity of the human eye," Proc. SPIE-IS&T, vol. 5294:231-238, Jan. 2004. 15 Pages.

S. Miller, M. Nezamabadi, and S. Daly, "Perceptual Signal Coding for More Efficient Usage of Bit Codes," SMPTE Annual Technical Conference, 2012. 39 Pages.

ITU-R Rec. BT. 2390-2, "High dynamic range television for production and international programme exchange," International Telecommunications Union, 2017. 45 Pages.

200

400

IMAGE FORMAT CONVERSION USING LUMINANCE-ADAPTIVE DITHERING

This application is a continuation of U.S. patent application Ser. No. 15/914,355, filed on Mar. 7, 2018, now U.S. Pat. No. 10,832,613, which is herein incorporated by reference in its entirety.

The present disclosure relates generally to digital media distribution, and relates more particularly to devices, non-transitory computer-readable media, and methods for converting image and video formats using luminance-adaptive dithering to reduce visual artifacts.

BACKGROUND

Recently developed image and video file formats, such as high dynamic range (HDR) and wide color gamut (WCG) formats, enable the creation and display of video and image content with more realistic contrast, brightness, and color. To support these file formats, a number of new electro-optical transfer functions have been developed. An electro-optical transfer function (EOTF) defines the non-linear mapping from digital code values representing pixels of an image to the luminance output of a display displaying the image. Some commonly used mappings are based on gamma transfer functions or logarithmic transfer functions.

The non-linearity of the EOTF generally implies that, depending on the particular EOTF being used during a file format conversion, the precision (i.e., number of digital code values) available in different luminance ranges may vary. Thus, due to the unique properties of each EOTF, different EOTFs may be preferable for different applications requiring file format conversion (e.g., production, compression for delivery, display, etc.). For instance, an EOTF that uses a gamma mapping in shadow and mid-tone regions but a logarithmic mapping in brighter luminance regions may be useful for providing backward compatibility to non-HDR displays when delivering a single video stream to both HDR and non-HDR displays. However, an EOTF that provides an absolute mapping from digital code value to display value may be better suited for maintaining creative intent when going from production to display.

SUMMARY

In one example, the present disclosure describes a device, computer-readable medium, and method for image format conversion using luminance-adaptive dithering. For instance, in one example, a method includes acquiring an image in a first format, wherein the first format is associated with a first electro-optical transfer function, identifying a second format to which to convert the image, wherein the second format is associated with a second electro-optical transfer function, and applying dithering to the image in the second format, based on an evaluation of a luminance-dependent metric against a predefined threshold, wherein the luminance-dependent metric is computed from at least one of the first electro-optical transfer function and the second electro-optical transfer function.

In another example, a device includes a processor and a computer-readable medium storing instructions which, when executed by the processor, cause the processor to perform operations. The operations include acquiring an image in a first format, wherein the first format is associated with a first electro-optical transfer function, identifying a second format to which to convert the image, wherein the second format is associated with a second electro-optical transfer function, and applying dithering to the image in the second format, based on an evaluation of a luminance-dependent metric against a predefined threshold, wherein the luminance-dependent metric is computed from at least one of the first electro-optical transfer function and the second electro-optical transfer function.

In another example, a computer-readable medium stores instructions which, when executed by the processor, cause the processor to perform operations. The operations include acquiring an image in a first format, wherein the first format is associated with a first electro-optical transfer function, identifying a second format to which to convert the image, wherein the second format is associated with a second electro-optical transfer function, and applying dithering to the image in the second format, based on an evaluation of a luminance-dependent metric against a predefined threshold, wherein the luminance-dependent metric is computed from at least one of the first electro-optical transfer function and the second electro-optical transfer function.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a technique for image format conversion using luminance-adaptive dithering. As discussed above, a number of new electro-optical transfer functions (EOTFs) have been developed to support file formats such as high dynamic range (HDR) and wide color gamut (WCG) formats, which enable the creation and display of video and image content with more realistic contrast, brightness, and color. Due to the unique properties of each EOTF, different EOTFs may be preferable for different applications requiring file format conversion (e.g., production, compression for delivery, display, etc.).

A typical HDR video production and delivery chain may include a number of interoperability points at which the video is converted from a source EOTF to a different, destination EOTF. The bit-depth of the video (i.e., the total number of digital code values available) typically remains constant (e.g., ten bits per color component, for source and destination) during these conversions. If the precision of the destination EOTF is lower than the precision of the source EOTF, video quality may be lost in luminance regions. For instance, loss of video quality may be most apparent in smooth regions of an image, i.e., where a smooth gradient in the source video will exhibit contouring or banding artifacts in the converted form.

Examples of the present disclosure applying dithering (i.e., an intentionally applied form of noise used to minimize large-scale patterns such as color banding) in a luminance-adaptive manner when converting an image or video file from a source EOTF to a destination EOTF (i.e., where the bit-depth may remain constant). A luminance-dependent metric may be computed for both the source EOTF and the destination EOTF. In one example, dithering is applied if the luminance-dependent metric of the destination EOTF falls below a predefined threshold that is determined based on the visibility of luminance differences to the human eye. In another example, dithering is applied if the difference between the luminance-dependent metrics of the source and destination EOTFs exceeds a predefined threshold that is determined based on an acceptable level of precision loss.

Although examples of the disclosure are discussed within the context of "file formats," which may imply that images are stored in files, it will be appreciated that these examples could also apply to image conversions in which no files are stored (e.g., such as real-time broadcasts). As such, any references to "file formats" also apply to formats that are not stored, unless stated otherwise.

Figure 1:
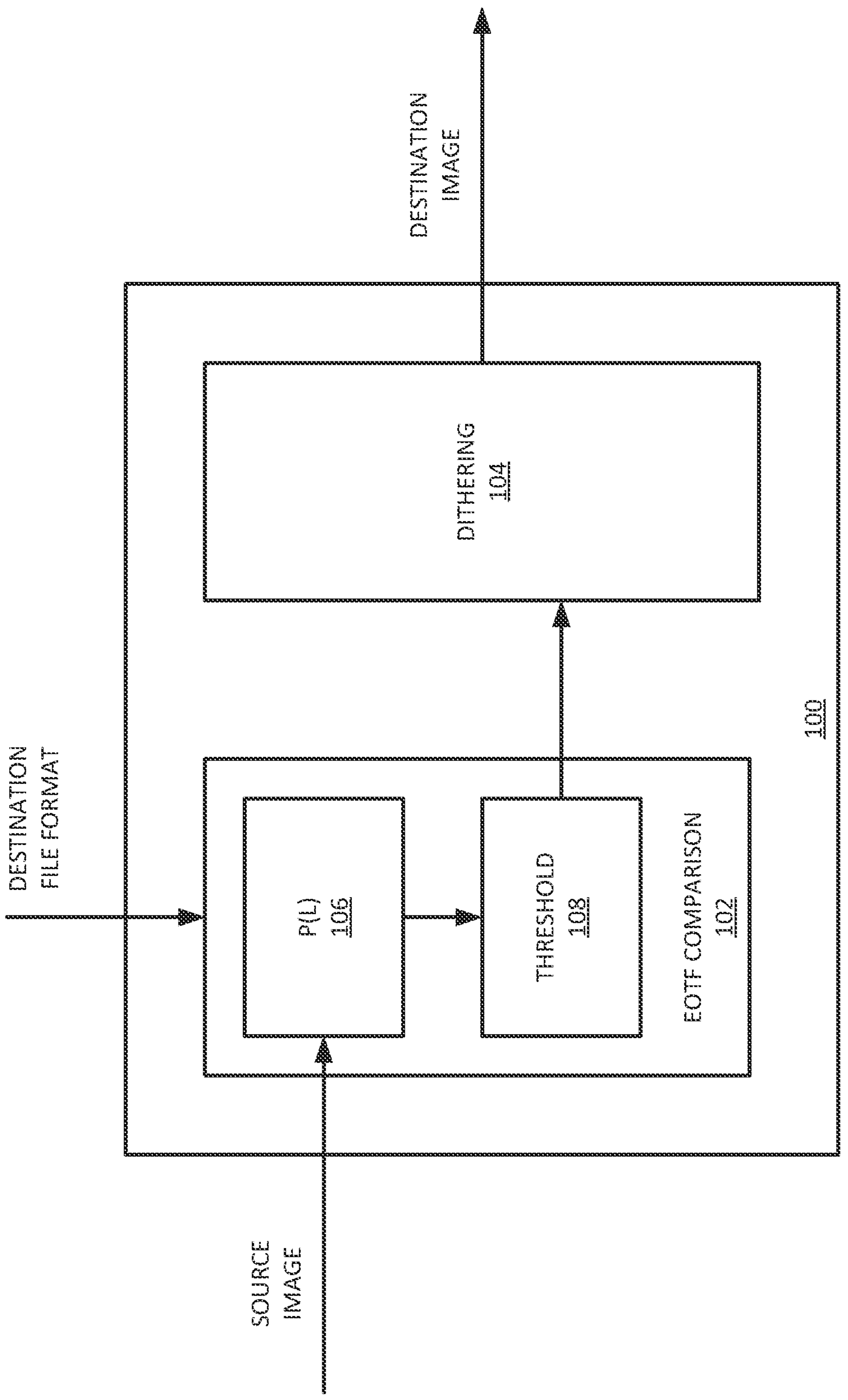
FIG. 1 illustrates a system for performing image format conversion using luminance-adaptive dithering.
Figure 4:
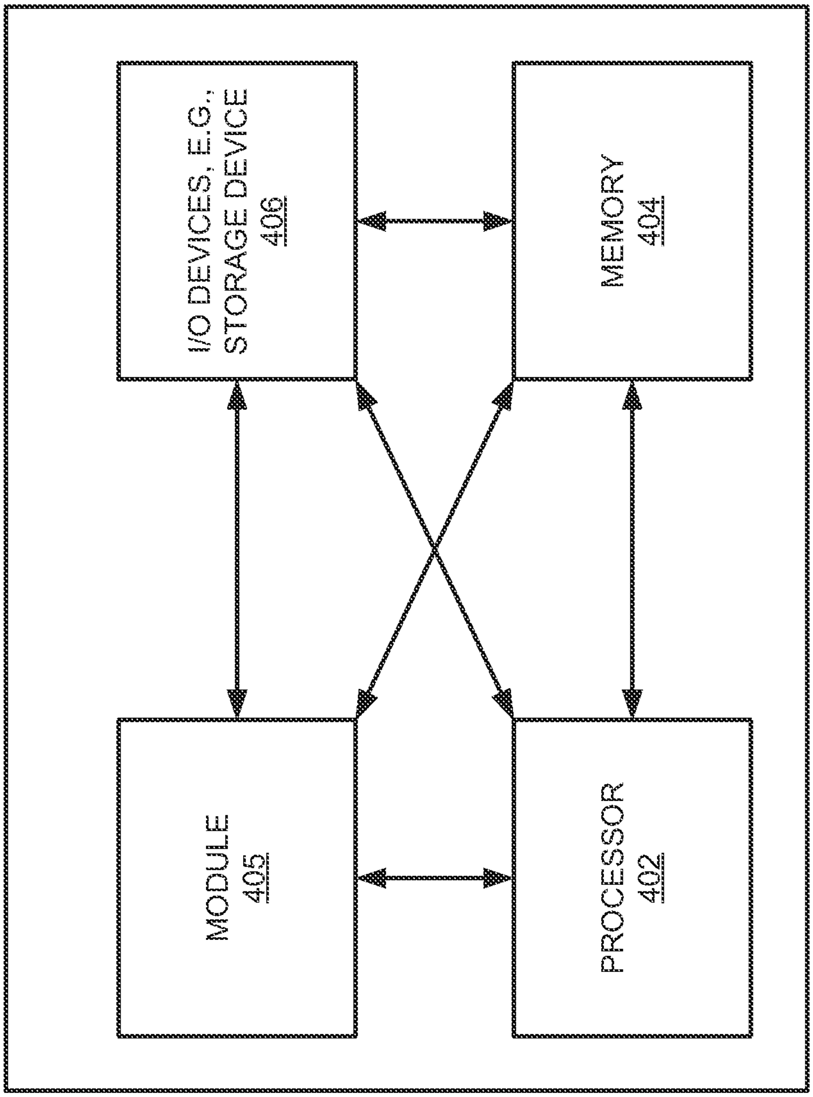
FIG. 4 depicts a high-level block diagram of a computing device specifically programmed to perform the functions described herein.

To better understand the present disclosure, FIG. 1 illustrates a system 100 for performing image format conversion using luminance-adaptive dithering. In one example, the system 100 may comprise a general purpose computer configured as a special-purpose computer, as illustrated in FIG. 4 and discussed below. In one example, the system 100 may perform the methods discussed below related to performing image file format conversion using luminance-adaptive dithering. For instance, the system 100 may take a source image, which is provided in a first image file format associated with a first EOTF, and convert the source image into a destination image in a second image file format associated with a second EOTF. The image file format conversion may be performed, for example, as part of a larger media distribution application or process (e.g., production, compression for delivery, display, etc.).

In one example, the system 100 generally comprises an EOTF comparison module 102 and a dithering module 102. The EOTF comparison module 102 examines the respective EOTFs of the source and destination images (e.g., the first and second EOTFs), and, based on this examination, determines whether or not to perform dithering in any regions of the converted image. In one example, the examination is performed on a pixel-by-pixel basis. In a further example, each pixel may be further broken down into separate color components (e.g., red, green, and blue) for examination.

In one example, the EOTF comparison module 102 computes a luminance-dependent metric 106, such as a luminance-dependent precision P(L), for each pixel in the source image and each corresponding pixel in the destination image. This luminance-dependent metric 106 may be obtained for each pixel/image pair based on the EOTF of the file format of the image (e.g., source image or destination image). Then, the EOTF comparison module 102 may evaluate the luminance-dependent metric 106 against a predefined threshold 108 in order to determine whether dithering should be performed on the destination image.

Based on the determination of the EOTF comparison module 102, the dithering module 104 may apply dithering to one or more pixels of the destination image to adjust the luminance(s) and/or colors of the one or more pixels.

In one example, the bit-depth of the destination image is equal to the bit-depth of the source image.

Figure 2:
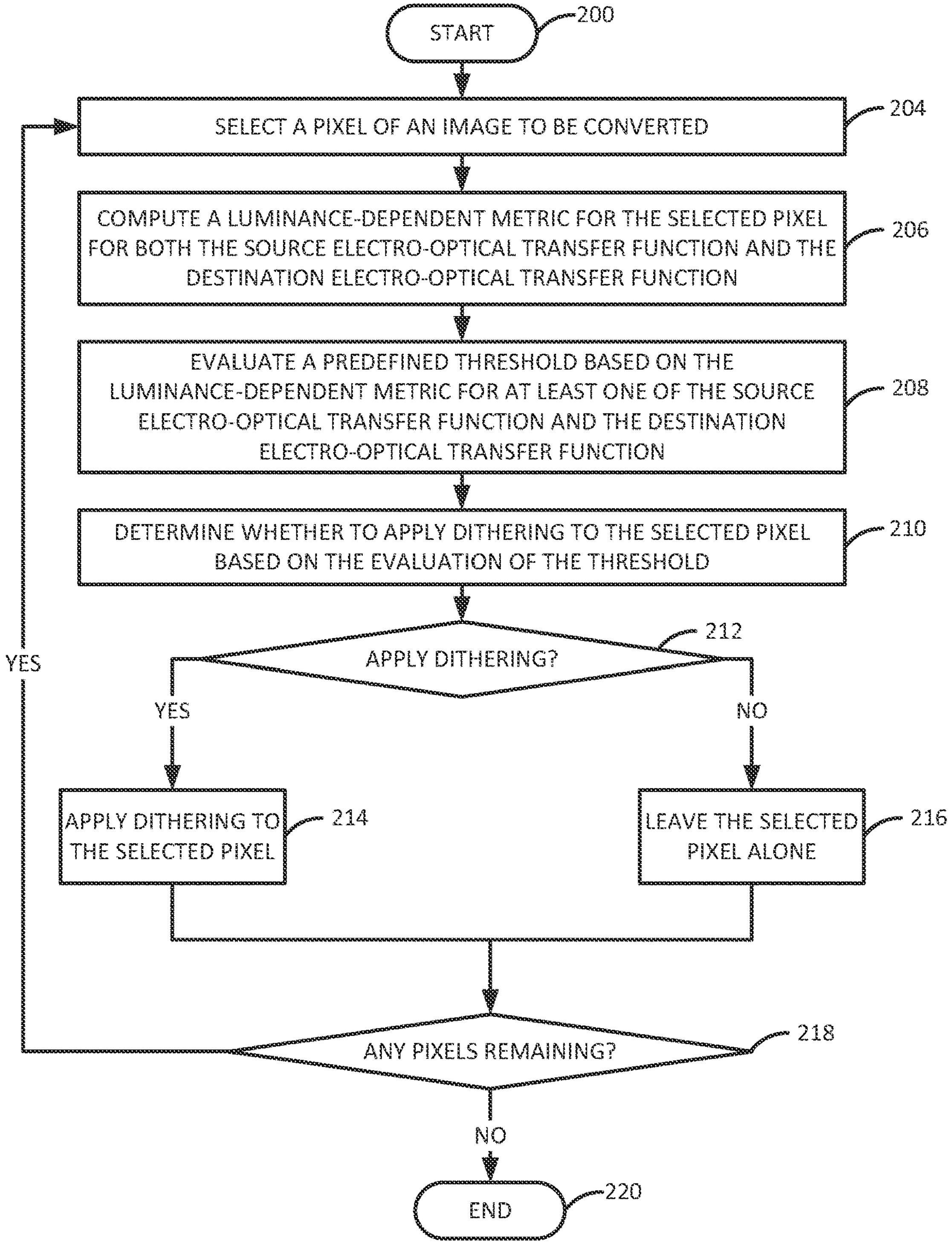
FIG. 2 illustrates a flowchart of an example method for converting an image from a first file format having a first electro-optical transfer function to a second file format having a second electro-optical transfer function.

To further aid in understanding the present disclosure, FIG. 2 illustrates a flowchart of an example method 200 for converting an image from a first file format having a first electro-optical transfer function to a second file format having a second electro-optical transfer function. The bit depth of the image in the first file format (e.g., the "source image") may or may not be the same as the bit-depth of the image in the second file format (e.g., the "destination image"). In one example, the method 200 may be performed by the system 100 illustrated in FIG. 1. However, in other examples, the method 200 may be performed by another device or devices. As such, any references in the discussion of the method 200 to components of FIG. 1 are not intended to limit the means by which the method 200 may be performed.

The method 200 begins in step 202. In step 204, a pixel of the image is selected.

In step 206, a luminance-dependent metric is computed for the pixel for both the source EOTF and the destination EOTF. In one example, the luminance-dependent metric may be referred to as "luminance-dependent precision," or P(L), where L denotes the surround luminance of the selected pixel. Thus, if the digital code value representing the luminance of the selected pixel in the source image is denoted as n, then the value of the surround luminance, L, for the selected pixel can be obtained as $EOTF_S(n)$, where $EOTF_S$ is the EOTF of the source image file format. In other examples, the value of the surround luminance, L, for the selected pixel may be computed as a weighted sum, a median value, a maximum value, or a minimum value of the luminance in a local neighborhood surrounding the selected pixel.

Given the surround luminance, L, for the selected pixel, the luminance-dependent precision P(L) for the selected pixel may be computed as follows:

$$P(L) = f\left(\frac{dEOTF^{-1}(L)}{dL}\right), \quad \text{(EQN. 1)}$$

where $EOTF^{-1}$ denotes the inverse EOTF (i.e., the digital code value associated with a given luminance). The EOTF may be the source EOTF (i.e., $EOTF_S$,) or the destination EOTF (i.e., $EOTF_D$). In this case, the luminance-dependent precision P(L) can be described as a monotonically increasing function of the number of codewords per luminance unit of the selected pixel. Any given EOTF may have different levels of precision in different luminance ranges. For instance, the source EOTF may have a higher precision than the destination EOTF in a first luminance range, but the destination EOTF may have a higher precision than the source EOTF in a second luminance range.

In step 208, a predefined threshold is evaluated based on at least one of the luminance-dependent metrics (i.e., based on the luminance-dependent metric for the source EOTF and/or the luminance dependent metric for the destination EOTF).

In one example, evaluation of the threshold includes determining whether the luminance-dependent metric of the destination EOTF, i.e., $P_D(L)$, is below a first threshold, $T_P(L)$. In one example, the value of the first threshold $T_P(L)$ is determined based on the visibility of luminance differences to the human eye. For instance, in one example, first threshold $T_P(L)$ may be obtained using a luminance-dependent just noticeable difference (JND) metric, where the JND metric indicates the smallest error in luminance that would be visible to the human eye. The JND metric in this case increases as the surround luminance of the selected pixel increases. In one example, assuming a JND metric, J(L), the first threshold $T_P(L)$ can be calculated as:

$$TP(L) = \frac{1}{J(L)}. \quad \text{(EQN. 2)}$$

In another example, evaluation of the threshold includes determining whether the difference between the luminance-dependent metric of the source EOTF, i.e., $P_S(L)$, and the luminance-dependent metric of the destination EOTF, i.e., $P_D(L)$ at the surround luminance of the selected pixel is above a second threshold T(L). In one example, the difference between $P_S(L)$ and $P_D(L)$, i.e., ΔP(L), can be calculated as:

$$\Delta P_{S \to D}(L) = P_S(L) - P_D(L). \quad \text{(EQN. 3)}$$

In this case, when ΔP(L) is greater than zero, this indicates a loss of precision when mapping the luminance of L from the source EOTF (i.e., $EOTF_S$) to the destination EOTF (i.e., $EOTF_D$). Conversely, when ΔP(L) is less than zero, this indicates that precision can be maintained. Since the computations of $P_S(L)$ and $P_D(L)$ account for the respective bit-depths of the source and destination file formats, ΔP(L) will indicate the difference in luminance precision even if the source file format's bit depth is different from the destination file format's bit depth.

In step 210, it is determined, based on the evaluation of the threshold in step 208, whether dithering should be applied to the selected pixel. For instance, in one example, if the first luminance-dependent metric of the destination EOTF, i.e., $P_D(L)$, is below the first threshold $T_P(L)$—i.e., $P_D(L)<T_P(L)$—then it is determined that dithering should be applied to the selected pixel. In another example, if the difference between the luminance-dependent metric of the source EOTF and the luminance-dependent metric of the destination EOTF is greater than the second threshold T(L)—i.e., ΔP(L)>T(L)—then it is determined that dithering should be applied to the selected pixel. In the latter case based on the second threshold T(L), the value of T(L) may be set to zero in order to apply dithering aggressively when loss of precision is detected. In another example, rather than making a binary (e.g., yes/no) decision as to whether to apply dithering, the strength of the dithering may be increased or decreased as a function of ΔP(L).

Step 212 confirms whether dithering should be applied to the selected pixel. If it is confirmed in step 212 that dithering should be applied to the selected pixel, then the dithering is applied to the selected pixel in step 214. In one example, the dithering may be applied based on the difference between the luminance-dependent metric of the source EOTF, i.e., $P_S(L)$, and the luminance-dependent metric of the destination EOTF, i.e., $P_D(L)$ at the surround luminance of the selected pixel. The difference between the luminance-dependent metric of the source and the luminance dependent metric of the destination may be calculated as discussed above in connection with EQN. 3.

Alternatively, if it is confirmed in step 212 that dithering should not be applied to the selected pixel, then the selected pixel is left alone in step 216.

In step 218, it is determined whether there are any pixels remaining in the image (i.e., any pixels for which a determination as to whether to apply dithering has not yet been made).

If it is determined in step 218 that there are pixels remaining in the image, then the method 200 returns to step 204 and selects a new pixel (i.e., a pixel for which a determination as to whether to apply dithering has not yet been made) of the image. The method 200 then proceeds as described above.

Alternatively, if it is determined in step 218 that there are no pixels remaining in the image, then the method 200 ends in block 220.

Thus, in some examples, the method 200 ensures that application of dithering is limited to the regions of the image in which video quality is lost due to conversion of the image's file format. Thus, the amount of additional noise and/or distortion that is added to the image is limited.

In one example, where it is determined through operation of the method 200 that dithering should be performed on a pixel, the dithering may be applied separately to each color component (e.g., red, green, blue) of the pixel. In this case, separate surround luminance values—denoted as $L_R$, $L_G$, and $L_B$—may be computed for each color component of the pixel. Steps 206-210 may then be performed separately for each color component of the pixel based on these surround luminance values, applying separate thresholds (e.g., $T_P(L_R)$, $T_P(L_G)$, $T_P(L_B)$, $T(L_R)$, $T(L_G)$, $T(L_B)$) to determine when and how much dithering should be applied. In another example, dithering may be applied to a pixel based on the aggregate luminance over all of its color components, which could be obtained as a weighted sum of the respective luminances of the individual color components. It should be noted that this technique is not limited to R,G,B color representations of the pixel. For instance, X,Y,Z tristimulus representations or other representations may be used instead and analyzed accordingly.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

In one example, one or both of the source file format and the destination file format may be defined as "scene-referred," as opposed, e.g., to "display-referred." In a display-referred format, the digital code values that represent the image are mapped to absolute luminance values on a display (e.g., up to the capabilities of the display). By contrast, in a scene-referred format, the digital code values represent scene light, and the mapping to luminance values on a display will be scaled relative to the capabilities of the display. For example, the same code value may be mapped to 500 candela per square meter ($cd/m^2$) on a 1,000 $cd/m^2$ peak luminance display, but scaled to 1,000 $cd/m^2$ on a 2,000 $cd/m^2$ peak luminance display.

Typically, scene-referred file formats are defined in terms of an opto-electronic transfer function (OETF) that maps scene light to digital code values, rather than in terms of an EOTF. Thus, when converting to and/or from a scene-referred format, the computation of luminance dependent precision P(L) (e.g., in accordance with step 206 of the method 200) may include an additional operation of deriving an EOTF from the OETF of the scene-referred file format that is the source and/or destination format). In one example, derivation of the EOTF from the OETF may include applying the inverse OETF to recover the relative scene light and then applying a display-dependent opto-optical transfer function (OOTF) to map the scene light to the luminance capabilities of the display.

Figure 3:
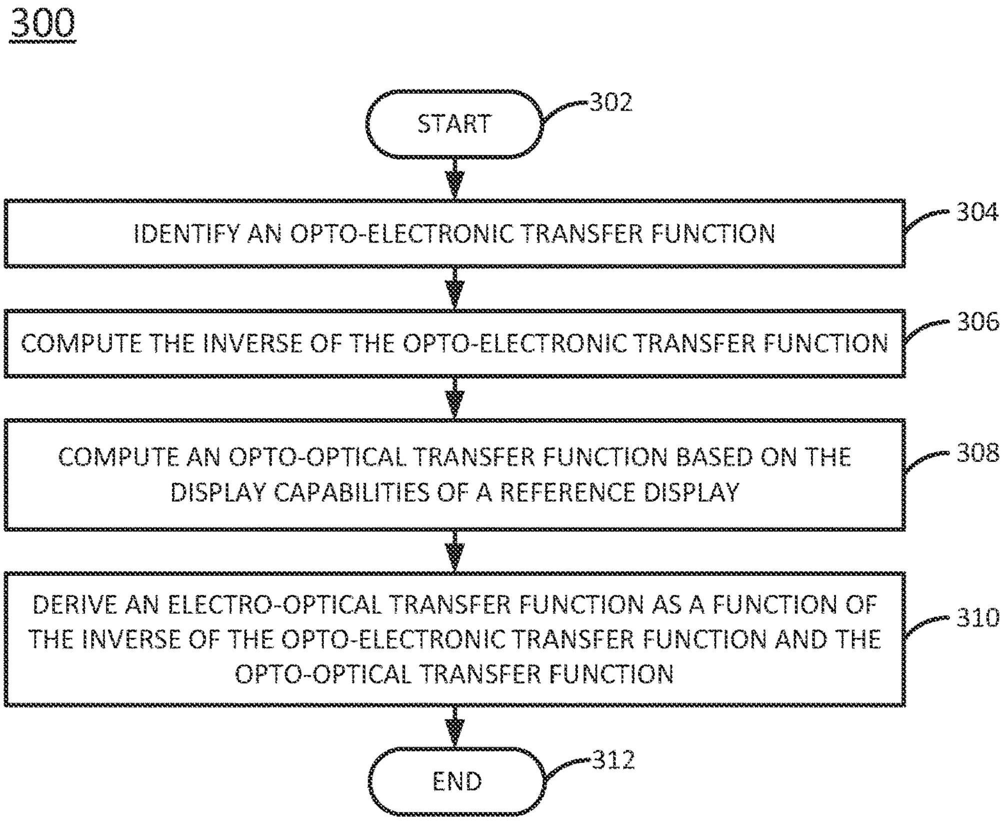
FIG. 3 illustrates a flowchart of an example method for deriving an electro-optical transfer function from an opto-electronic transfer function.

In one example, the EOTF is derived from the OETF based on an assumption of a specific reference display's (or virtual display's) capabilities (e.g., peak luminance of 1,000 $cd/m^2$ with a DCI-P3 color gamut). FIG. 3 illustrates a flowchart of an example method 300 for deriving an electro-optical transfer function from an opto-electronic transfer function. In one example, the method 300 may be performed by the system 100 illustrated in FIG. 1. However, in other examples, the method 300 may be performed by another device or devices. As such, any references in the discussion of the method 300 to components of FIG. 1 are not intended to limit the means by which the method 300 may be performed.

The method 300 begins in step 302. In step 304, an opto-electronic transfer function (OETF) is identified.

In step 306, the inverse of the OETF (i.e., the relative scene light values that correspond to each digital codeword) is computed.

In step 308, an opto-optical transfer function (OOTF) is computed from the display parameters of the reference display. The OOTF maps scene light values to display light values of the reference display.

In step 310, the EOTF for the OETF is derived as a function of the inverse of the OETF computed in step 306 and the OOTP computed in step 308. In one example, the EOTF comprises a mapping from the digital codewords of the OETF to the display light values of the reference display.

The method ends in step 312. The EOTF derived in accordance with the method 300 may be used to determine the luminance-dependent precision P(L) as discussed above.

In another example, the EOTF may be derived from the OETF using a different set of assumptions. For example, if the capabilities of the display on which the scene-referred image format has been or will be viewed are known, then the EOTF can be adjusted to fit the capabilities of that display rather than a generic reference display.

In another example (e.g., where the destination file format is a scene-referred image format), dithering can be minimized by performing multiple conversions in which each conversion (and, therefore, each level of dithering), corresponds to a particular target display.

In another example, a conservative estimate for the luminance-dependent precision of the target EOTF, $P_D(L)$, may be obtained when the destination image file format is a scene-referred image format. This conservative estimate may be obtained by using the EOTF that provides the minimum value for $P_D(L)$ over a set of most likely EOTFs, given the particular scene-referred image file format.

In another example, is the transfer function associated with the source image file format is an EOTF, and the transfer function associated with the destination image file format is an OETF, then the source image can be pre-analyzed to determine the peak luminance and color gamut information.

In another example, an OOTF may be determined based on available metadata describing the peak luminance and color gamut of the reference display.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, a system 100 (such as might be used to perform the method 200) could be implemented as illustrated in FIG. 4.

As depicted in FIG. 4, the system 400 comprises a hardware processor element 402, a memory 404, a dithering module 405 for performing image format conversion using luminance-adaptive dithering, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The dithering module 405 may include circuitry and/or logic for performing special purpose functions relating to performing image format conversion using luminance-adaptive dithering. The input/output devices 406 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present dithering module or process 405 for performing image format conversion using luminance-adaptive dithering (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present dithering module 405 (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

acquiring, by a processing system including at least one processor, an image in a first format, wherein the first format is associated with a first electro-optical transfer function;

identifying, by the processing system, a second format to which to convert the image, wherein the second format is associated with a second electro-optical transfer function; and applying, by the processing system, dithering to the image in the second format, based on an evaluation of at least a first luminance-dependent metric against a first predefined threshold that indicates the dithering is to be applied, wherein the first luminance-dependent metric is a luminance-dependent precision based on a surround luminance of a second pixel of the image in the second format and is computed from the second electro-optical transfer function, wherein the first predefined threshold is based on a luminance-dependent just noticeable difference metric, and wherein the first luminance-dependent metric is a monotonically increasing function of a number of codewords per luminance unit of the second pixel of the image in the second format.

2. The method of claim 1, wherein a bit-depth of the image in the first format is equal to a bit-depth of the image in the second format.

3. The method of claim 1, further comprising, subsequent to the identifying but prior to the applying:

computing the first luminance-dependent metric for the second pixel of the image in the second format; and determining that the first luminance-dependent metric for the second pixel falls below the first predefined threshold, wherein the dithering is applied to the second pixel.

4. The method of claim 3, wherein the luminance-dependent just noticeable difference metric increases as the surround luminance of the second pixel increases.

5. The method of claim 1, further comprising, subsequent to the identifying but prior to the applying:

computing a second luminance-dependent metric for a first pixel of the image in the first format;

computing the first luminance-dependent metric for the second pixel of the image in the second format; and determining that a difference between the second luminance-dependent metric for the first pixel and the first luminance-dependent metric for the second pixel is above a second predefined threshold, wherein the dithering is applied to the second pixel.

6. The method of claim 5, wherein the second predefined threshold is based on an ability to maintain luminance precision when mapping between the first electro-optical transfer function and the second electro-optical transfer function.

7. The method of claim 5, wherein a strength of the dithering is varied as a function of the difference.

8. The method of claim 5, wherein the first luminance-dependent metric and the second luminance-dependent metric are computed on a pixel-by-pixel basis for pixels of the image in the first format and pixels of the image in the second format.

9. The method of claim 8, wherein the dithering is applied separately to each color component of the second pixel of the image in the second format.

10. The method of claim 8, wherein the dithering is applied to the second pixel of the image in the second format based on an aggregate luminance over all color components of the second pixel.

11. The method of claim 1, wherein the second format is a scene-referred format.

12. The method of claim 1, wherein the luminance-dependent precision is denoted as P(L) and is computed as $$P(L) = f\left(\frac{dEOTF^{-1}(L)}{dL}\right),$$

where L is the surround luminance for the second pixel, EOTF is the first electro-optical transfer function or the second electro-optical transfer function, and $EOTF^{-1}$ denotes an inverse of EOTF.

13. A device comprising:

a processing system including at least one processor; and a computer-readable medium storing instructions which, when executed by the processing system, cause the processing system to perform operations, the operations comprising:

acquiring an image in a first format, wherein the first format is associated with a first electro-optical transfer function;

identifying a second format to which to convert the image, wherein the second format is associated with a second electro-optical transfer function; and applying dithering to the image in the second format, based on an evaluation of at least a first luminance-dependent metric against a first predefined threshold that indicates the dithering is to be applied, wherein the first luminance-dependent metric is a luminance-dependent precision based on a surround luminance of a second pixel of the image in the second format and is computed from the second electro-optical transfer function, wherein the first predefined threshold is based on a luminance-dependent just noticeable difference metric, and wherein the first luminance-dependent metric is a monotonically increasing function of a number of codewords per luminance unit of the second pixel of the image in the second format.

14. A non-transitory computer-readable medium storing instructions which, when executed by a processing system including at least one processor, cause the processing system to perform operations, the operations comprising:

acquiring an image in a first format, wherein the first format is associated with a first electro-optical transfer function;

identifying a second format to which to convert the image, wherein the second format is associated with a second electro-optical transfer function; and applying dithering to the image in the second format, based on an evaluation of at least a first luminance-dependent metric against a first predefined threshold that indicates the dithering is to be applied, wherein the first luminance-dependent metric is a luminance-dependent precision based on a surround luminance of a second pixel of the image in the second format and is computed from the second electro-optical transfer function, wherein the first predefined threshold is based on a luminance-dependent just noticeable difference metric, and wherein the first luminance-dependent metric is a monotonically increasing function of a number of codewords per luminance unit of the second pixel of the image in the second format.

15. The non-transitory computer-readable medium of claim 14, wherein a bit-depth of the image in the first format is equal to a bit-depth of the image in the second format.

16. The non-transitory computer-readable medium of claim 14, the operations further comprising, subsequent to the identifying but prior to the applying:

computing the first luminance-dependent metric for the second pixel of the image in the second format; and determining that the first luminance-dependent metric for the second pixel falls below the first predefined threshold, wherein the dithering is applied to the second pixel.

17. The non-transitory computer-readable medium of claim 16, wherein the luminance-dependent just noticeable difference metric increases as the surround luminance of the second pixel increases.

18. The non-transitory computer-readable medium of claim 14, the operations further comprising, subsequent to the identifying but prior to the applying:

computing a second luminance-dependent metric for a first pixel of the image in the first format;

computing the first luminance-dependent metric for the second pixel of the image in the second format; and determining that a difference between the second luminance-dependent metric for the first pixel and the first luminance-dependent metric for the second pixel is above a second predefined threshold, wherein the dithering is applied to the second pixel.

19. The non-transitory computer-readable medium of claim 18, wherein the second predefined threshold is based on an ability to maintain luminance precision when mapping between the first electro-optical transfer function and the second electro-optical transfer function.

20. The non-transitory computer-readable medium of claim 18, wherein a strength of the dithering is varied as a function of the difference.

* * * * *